United States Patent [19]
Knapp et al.

[11] 3,783,984
[45] Jan. 8, 1974

[54] SELF-ADJUSTING DEVICE FOR DISC BRAKES

[75] Inventors: Wilhelm Knapp, Friedrichsthal; Siegfried Ohmayer, Offenbach, both of Germany

[73] Assignee: ITT Industries, Inc., New York, N.Y.

[22] Filed: July 20, 1972

[21] Appl. No.: 273,589

[30] Foreign Application Priority Data
Aug. 4, 1971 Germany.................. P 21 39 030.7

[52] U.S. Cl............................ 188/196 BA, 188/71.9
[51] Int. Cl............................................. F16d 65/56
[58] Field of Search ................... 188/71.9, 79.5 GE, 188/196 D, 196 F, 196 BA

[56] References Cited
UNITED STATES PATENTS
3,331,472  7/1967  Swift................................. 188/71.9
3,498,423  3/1970  Belart ........................... 188/71.9 X

FOREIGN PATENTS OR APPLICATIONS
1,179,235  1/1970  Great Britain..................... 188/71.9

Primary Examiner—Duane A. Reger
Attorney—C. Cornell Remsen, Jr. et al.

[57] ABSTRACT

This relates to self-adjusting devices to compensate for worn brake linings and more particularly to such self-adjusting devices as employed in a hollow disc brake piston. A more compact structure and economy of structural components are achieved in that the return spring is disposed between an abutting element concentric with the adjusting nut and an abutment secured to the end of the adjusting nut remote from the adjusting spindle.

29 Claims, 6 Drawing Figures

SELF-ADJUSTING DEVICE FOR DISC BRAKES

BACKGROUND OF THE INVENTION

This invention relates to self-adjusting devices to compensate for brake lining wear and more particularly to a self-adjusting device employed in a hollow disc brake piston.

German Patent DOS 1,921,898 discloses a self-adjusting device for a hollow disc brake piston which is axially displaceable within a predetermined play and which is provided with an adjusting spindle having a self-locking thread. An adjusting nut is threaded onto the adjusting spindle so that the adjusting nut and adjusting spindle cooperate to limit the backwards movement of the piston. An engaging sleeve twistably arranged in a concentric manner on the adjusting nut is provided. The engaging sleeve includes a slot which runs in an inclined plane and which cooperates with a pin projecting from the adjusting nut. An abutment element is firmly connected with the piston such that, upon an axial movement of the piston away from the adjusting nut, the abutment element comes into a frictionally structure engagement with the engaging sleeve so that the pin, sliding into the slot, twists the adjusting nut in the direction of an adjusting step. The brake clearance which ensures the predetermined play is provided between the adjusting nut and an element which is undisplaceable in the axial direction of the piston. A return spring is provided between the abutment element and the adjusting nut.

SUMMARY OF THE INVENTION

An object of the invention is to improve such an adjusting device with respect to its structure. In particular, a more compact structure is achieved and structural components are economized without derogating from the operational safety and capacity of the device.

A feature of the present invention is to provide a self-adjusting device for a disc brake comprising: an actuating piston having a longitudinal axis and bore coaxial of the axis, the bore being closed at one end of the piston; an adjusting spindle in a fixed position coaxial of the axis having threads on the outer surface thereof and extending out of the other end of the piston; an adjusting nut having threads for threading onto the spindle; an arrangement associated with the nut to rotate the nut on the spindle to permit the desired self-adjustment; an abutment secured to the nut adjacent the one end of the piston; an abutment element coaxial of the axis and the nut fixed to the inner surface of the bore to prevent axial motion thereof; and a return spring disposed between the abutment and the abutment element.

The structural relationship between the return spring, the abutment and the abutment element reduces the longitudinal axial dimension of the self-adjusting device.

An especially small axial extension is achieved by seating a disc spring on the abutment which further rests on the transverse annular seat of an abutment housing which is situated a small distance from the abutment.

In a preferred embodiment the abutment element is designed as a geared sleeve the circumference of which only touches the hollow piston wall or piston bore wall at certain intervals. This arrangement favors the evacuation of the interior of the piston.

In a further embodiment of the invention the abutment element is an abutment housing whose outside circumference which has contact with the piston wall is provided with an annular groove which fixes the abutment housing via a spring ring in an annular groove provided at the inside wall of the piston. This arrangement has the purpose of preventing a destruction of the adjusting device if the piston should be moved beyond the play between the abutment and the abutment housing. In such a case the connection between the abutment housing and the piston established by the spring ring would be undone.

The brake clearance is preferably provided between the threads of the adjusting nut and adjusting spindle.

The engaging sleeve is preferably seated on the adjusting nut within the abutment housing such as to be able to freely rotate and is advantageously provided with a cone whose base is adjacent the one end of the piston. The cone cooperates with an annular bearing surface on the abutment housing in such a way that during the adjusting operation a torsionally strong frictional contact between the cone and the housing is achieved. To this end, the engaging sleeve may be connected with the adjusting nut via a helical torsion spring disposed adjacent the other end of the piston. The helical torsion spring will always act on the engaging sleeve in order to twist the same in the direction to cause an abutment of the cone with the annular bearing surface. According to a further embodiment the helical torsion spring also exerts an axial force on the engaging sleeve which will bring the cone into slight contact with the annular bearing surface, the twisting thereby not being disturbed. In this way, a safe abutment of the cone with the abutment housing of the piston is always ensured.

According to a further embodiment the abutment housing has an internal cylindrical surface which is stepped adjacent the one end of the piston in order to provide the transverse annular seat for the disc spring and the annular bearing surface for the cone.

According to a further embodiment a retaining ring is disposed on the nut behind the housing and the engaging sleeve adjacent the other end of the piston.

An especially expedient embodiment provides a groove in the piston at the one end thereof to guide the abutment secured to the adjusting nut. The abutment is advantageously as thick as the groove is long so that in normal operation the abutment fits exactly within the groove.

In order to rate the return force strong enough and to further achieve an operational safety the disc spring expediently consists of two individual disc springs lying on top of each other.

The adjusting nut is preferably secured against twisting by prestressing the return spring. In this way the friction between the return spring and the abutment secured to the adjusting nut efficiently prevents twisting of the adjusting nut.

A further particularly expedient embodiment is designed such that the abutment element is an abutment ring fixed at the other end of the piston, the inner edge of said abutment ring cooperating with the cone of the engaging sleeve which tapers towards the rear. In doing so, a helical pressure spring coaxial of the adjusting nut acting as return spring is preferably extended between the abutment ring and the abutment.

It is further possible to provide an anti-twisting ring between the abutment and the pressure spring which will secure the adjusting nut against twisting. Said anti-twisting ring is advantageously supported in longitudinal grooves in the inner wall of the piston such as to be torsionally strong, yet axially displaceable.

The embodiment including the above-mentioned helical pressure spring as the return spring is also especially compact in the axial direction since the return spring surrounds both the engaging sleeve and the helical torsion spring so that all these elements require a smaller structural space.

In one embodiment the engaging sleeve is preferably arranged within the helical pressure spring on the adjusting nut so as to be able to freely rotate. It is further possible to dispose the helical torsion spring between the abutment and the engaging sleeve and to have the helical torsion spring exert a torque on the engaging sleeve in a direction such that the cone abuts against the abutment ring.

In order to ensure an efficient evacuation of the piston interior the abutment ring's inside and outside circumferences are provided with vent slots.

A favorable structural arrangement in connection with a stable piston design is ensured by the fact that the bore of the piston adjacent the one end of the piston conforms to the shape of the anti-twisting ring.

A further preferred embodiment is designed such that the abutment element is a sheet-metal housing having on the end thereof adjacent the other end of the piston at the rear end of cone elements bent off from the sheet metal housing. The cone elements cooperate with a catch element disposed on the adjusting nut. In this embodiment the frictional cone is not disposed at the catch element or engaging sleeve but rather at the abutment element itself. This inverted disposition of the elements is also possible in the other embodiments.

At the inside of the sheet-metal housing there is preferably provided guide segments, the disc-shaped catch element being held with a play between said guide segments and the cone elements.

The catch element is expediently a punched disc having teeth on the inner periphery thereof which cooperates with a steep thread provided on the outer surface of the adjusting nut. This design on the catch element may also apply in the other embodiments.

According to another embodiment the abutment housing is held in abutment with a step of the piston interior by means of an expanding ring. Thereby it will be also safeguarded that the piston will not come too far out of the cylinder, because in the event of an excessive stress the expanding ring will cause a separation of the abutment housing from the piston. This embodiment allows a very compact structure since the return spring which is designed as disc spring is housed in a step-like expansion of the piston, projects inwards beyond the step, and rests against a spacer sleeve which abuts the flange. The helical torsion spring expediently extends within the spacer sleeve and the disc spring into and around the adjusting nut. In this way the return spring and the helical torsion spring are virtually housed in the same axial range within the piston.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENTS

Figure 1:
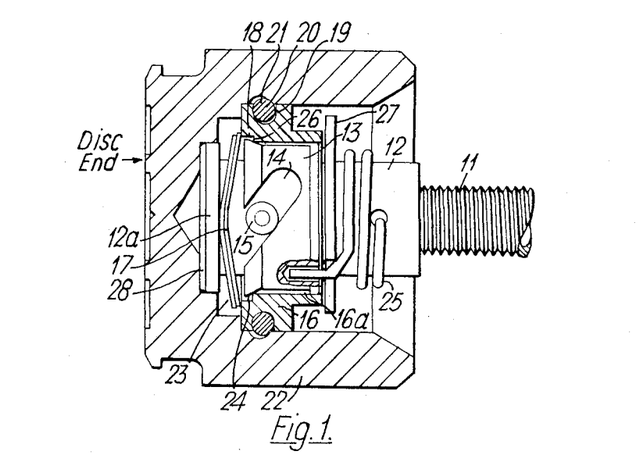
FIG. 1 illustrates a partial axial cross section taken through a disc brake piston provided with an adjusting device in accordance with the principles of the present invention.

According to FIG. 1 brake piston 22 has a longitudinal axis and a bore coaxial of the longitudinal axis, the bore being closed at one end of piston 22, namely, the disc end of piston 22, the bore being present to form a hollow piston 22. Piston 22 has an internal annular groove 21 in which a spring ring 20 is disposed and which engages an external annular groove 19 of an abutment housing 16 serving as an abutment element. Thereby abutment housing 16, on the one hand, is firmly fixed in both the axial and the circumferential directions within piston 22. On the other hand, however, there exists the possibility that in the event of an excessive axial force abutment housing 16 may separate from piston 22. This arrangement is a safety arrangement to prevent destruction of the adjusting device. However, when regarding the function of the inventive adjusting device abutment housing 16 is to be considered as a structural element firmly connected with piston 22.

The adjusting spindle 11 is the only part that is firmly connected with the brake cylinder, the adjusting nut 12 being screwed onto said adjusting spindle 11. At its head (adjacent the disc end of the piston), adjusting nut 11 is provided with an abutment or a flange 12a which is essential for the operation of the adjusting device.

On adjusting nut 12 an engaging sleeve 13 is seated which is provided with an inclined slot 14 which opens towards the disc end of the piston, a pin 15 fixed to adjusting nut 12 engaging slot 14. At its disc end the engaging sleeve 13 has a cone 24 which expands towards the outside (the cones base is adjacent the disc end of the piston). Cone 24 cooperates with an annular bearing surface 26 in a manner to be described further below. Annular bearing surface 26 is provided at the front end (adjacent the disc end of the piston) of a cylindrical surface 16a of abutment housing 16. Surface 26 is formed by the fact that cylindrical surface 16a has a step at its front end. Thereby, at the same time, an annular seat 18 is formed on which a disc spring 17 acting as return spring is seated. Disc spring 17, on the other hand, rests on flange 12a of adjusting nut 12. In the normal position illustrated in FIG. 1, disc spring 17 is prestressed such that due to the frictional connection between flange 12a and abutment housing 16 an undesired twisting of the adjusting nut caused, e.g., by vibrations, is prevented. Between flange 12a and the front end of engaging sleeve 13 there is a play 23 which is reduced during the adjusting operation. If due to unusual conditions the play should be reduced entirely and safety arrangement against destruction ensured by the elements 19, 20 and 21 will come into effect.

Further, a helical torsion spring 25 extends between engaging sleeve 13 and adjusting nut 12. Helical torsion spring 25 exerts a torque on the engaging sleeve in relation to the adjusting nut in such direction that pin 15 will come to abut the lower edge of slot 14 as illustrated in FIG. 1. Further, helical torsion spring 25 generates a slight axial force such that cone 24 will come to abut annular bearing surface 26.

According to the invention, behind abutment housing 16, a retaining ring 27 is disposed on adjusting nut 12 which will prevent abutment housing 16 from dropping out of piston 22 in the event of separation of abutment housing 16 from piston groove 21.

The operation of the embodiment of FIG. 1 is as follows:

Upon a pressure increase in the hydraulic brake system the piston 22 of FIG. 1 will move towards the left until the non-illustrated brake lining will come to abut the equally non-illustrated brake disc. The brake lining not yet worn, the adjusting device will remain in the position shown in FIG. 1 and the movability of piston 22 is ensured by the play provided between the threads of elements 11 and 12.

If the brake lining is worn such that the axial play of the threads elements 11 and 12 is not sufficient for bringing the brake lining into abutment with the brake disc, adjusting nut 12 will stand still from that moment where the axial play of the thread is overcome while piston 22 together with abutment housing 16 will advance further towards the disc under the influence of the hydraulic pressure. In doing so, flange 12a will lift off from the bottom of groove 28 in which it is disposed and disc spring 17 will be compressed. Thereby the friction at adjusting nut 12 will increase. At the same time the pressure of annular bearing surface 26 on cone 24 will increase in such a way that due to the friction between cone 24 and annular bearing surface 26 a mutual twisting of these elements is no longer possible. Thus, engaging sleeve 13 is advanced further axially by the still advancing piston 22. Thereby, the lower ramp of slot 14 will slide along pin 15 and a twisting of adjusting nut 12 in the sense of the desired adjusting step results.

The essential feature of this type of adjusting device is that the frictional torque between cone 24 and annular bearing surface 26 is greater than the sum of the torques in an opposite direction.

The braking terminated, the piston will move back into its initial position under the action of disc spring 17 and under the roll-back action of the non-illustrated piston seal. In doing so, finally, the torsionally strong connection between annular bearing surface 26 and cone 24 caused by friction is neutralized so that helical torsion spring 25 is able to twist engaging sleeve 13 back into its initial position.

Now the adjusting device is ready for the next adjusting step.

It is of essential importance that disc spring 17 is constantly prestressed and, thus, prevents a twisting of adjusting nut 12.

If, e.g., in the event of disassembled linings the foot brake is actuated several times so that piston 22 will surpass the play 23 the safety device against destruction, elements 19, 20 and 21 will separate from piston 22 and will prevent the destruction of the adjusting device.

According to the invention the adjusting step is very small and does not correspond to the total stroke of a piston. A relative strong lining wear will be adjusted after several actuations only in order to avoid jamming of the brake linings which under thermal action will expand. The brake clearance, thus, is influenced but slightly by the expansion and compressibility of the brake linings and preferably does not lie below a minimum clearance of 0.05 mm (millimeters).

The special advantage of the inventive adjusting device consists in the fact that it may be used for both the smallest and largest pistons. In contrast to the adjusting device referred to in the introductory part of this specification under the heading "Background of the Invention" several individual components can be dispensed with without derogating from the operational safety. For instance, the anti-twisting device may be dispensed with which is provided in the known adjusting device.

Abutment housing 16 is preferably a geared or toothed sleeve provided with various passages distributed over its circumference. In this way the part of the piston interior which according to FIG. 1 is left of abutment housing 16 can be efficiently evacuated.

Figure 2:
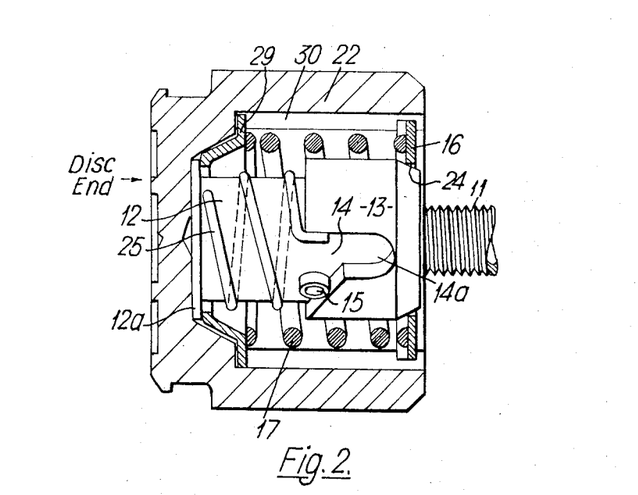
FIG. 2 illustrates a partial axial cross section of another embodiment of an adjusting device in accordance with the principles of the present invention.
Figure 3:
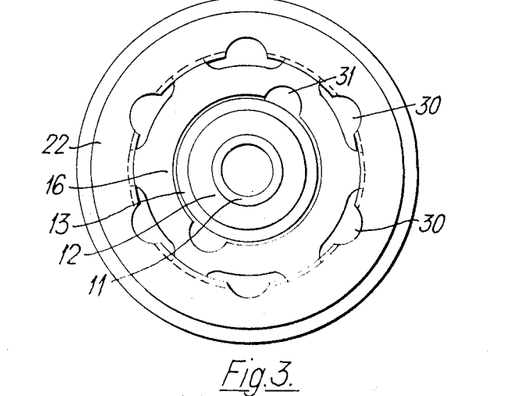
FIG. 3 illustrates a back view of FIG. 2.

In the embodiment illustrated in FIGS. 2 and 3, the elements which have the same function as those in FIG. 1 are marked with the same reference numbers as in FIG. 1. However, a normal helical spring 17 is used as the return spring instead of a disc spring and additionally an anti-twisting ring 29 is provided. Ring 29 abuts flange 12a of adjusting nut 12 and is guided in an axially displaceable manner at the outer circumference thereof in longitudinal grooves 30 formed in the inner surface of piston 22 and yet is secured against twisting. Anti-twisting ring 29 establishes the connection between the left end of pressure spring 17 and flange 12a. In the normal position illustrated in FIG. 2 there is a small space between the anti-twisting ring 29 and the piston bottom such that the force of spring 17 may come into effect between the abutment plate of ring 16 and flange 12a.

The abutment element or housing of this embodiment is an abutment plate or ring 16 firmly connected with piston 22. According to FIG. 3 the circumference of plate 16 has numerous vent slots 31.

The special advantage of the embodiment of FIGS. 2 and 3 consists in the fact that the coaxial arrangement of return spring 17, on the one hand, and of helical torsion spring 25 and the arrangement of the abutment element, on the other hand, effects a particularly compact axial structure. It is of further advantage that the axial stroke of piston 22 can be relatively great without involving a destruction of the adjusting device. Thus, it is possible to dispense with the safety device against destruction required in the embodiment of FIG. 1. Instead, according to the invention, an axial elongation 14a of slot 14 is provided at the bottom of slot 14. Elongation 14a permits a large stroke of piston 22 until pin 15 abuts the bottom of elongation 14a. Thereby, a sufficient safety against a destruction of the adjusting device is ensured.

The operation of the embodiment of FIGS. 2 and 3 is completely analogous to that of the embodiment of FIG. 1.

Figure 4:
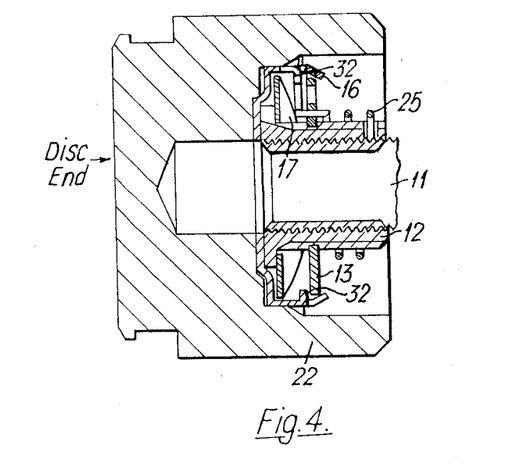
FIG. 4 illustrates a partial axial cross section taken through a disc brake piston provided with still another embodiment of adjusting device in accordance with the principles of the present invention.
Figure 5:
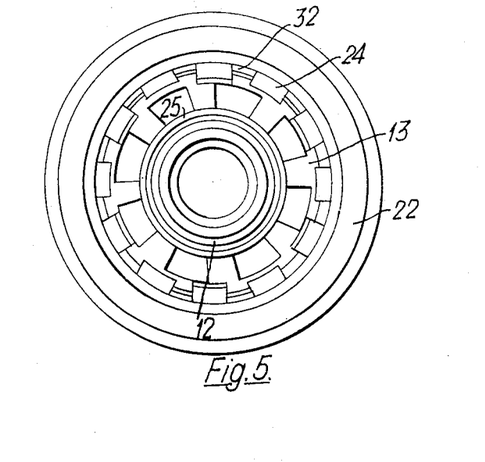
FIG. 5 shows a back view of FIG. 4.

In the embodiment of FIGS. 4 and 5, frictional cone 24 is provided on abutment element 16 which is a sheet-metal housing. Sheet-metal housing 16 is firmly connected with piston 22 so that it will be carried along by the latter's movements.

In this embodiment the engaging sleeve is replaced by a catch element 13 in the form of an easily manufacturable disc which is punched and geared on its inner periphery, the teeth of which cooperate with a steep thread provided on the outer surface of the adjusting nut 12. Thereby, an effect is achieved which is analogous to that achieved by slot 14 and pin 15 of the other embodiments.

In order to safely secure the catch element towards the front end (the disc end of the piston), guide segments 32 are provided in sheet-metal housing 16. Between guide segments 32 and cone parts 24, which are bent towards the interior, catch element 13 is disposed with a play.

The operation of the embodiment of FIGS. 4 and 5 is analogous to that of the other embodiments.

In the embodiment of FIGS. 4 and 5 the number of the necessary individual components is advantageously reduced by another four components. Further, according to the invention a relatively cheap sheet-metal housing 16 finds application. Moreover, the axial dimensions are reduced even more.

According to the invention the assembly can be carried out without incurring great expenses by moulding housing 16 by means of pressing tools. In doing so, manufacturing tolerances are bridged. A constant tight fit is achieved in that the further forming is of elastic nature. In this operation guide segments 32 and cone parts 24 are slightly bent for catch element 13. According to the invention cone parts 24 and guide segments 32 are alternatively bent inwards so that these two elements can be made in the easiest way of manufacture.

The slots remaining between the individual cone parts 24 serve for the evacuation of the piston interior.

On the left, return spring 17, which is but roughly indicated in FIG. 4, rests on a part connected with adjusting nut 12 while, on the right, spring 17 is supported by part of the sheet-metal housing or by sheet metal housing 16 itself. The part on which spring 17 may rest is fixed in piston 22 by means of a pinch fit.

A further advantage of the embodiment of FIG. 4 consists in the fact that sheet-metal housing 16 integrates the entire adjusting device into one structural unit.

Figure 6:
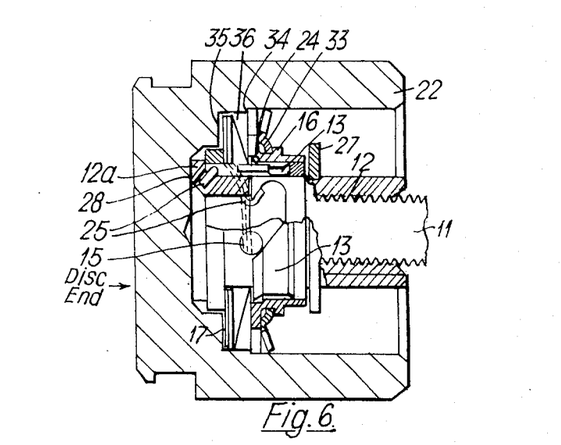
FIG. 6 illustrates a partial axial cross section of a disc brake piston provided with a further embodiment of adjusting device in accordance with the principles of the present invention, the elements on one side off the central axis of the piston being shown only.

The embodiment illustrated in FIG. 6 resembles that of FIG. 1 very closely. However, among other things, it differs from the embodiment of FIG. 1 in the special manner of securing this device against destruction by expanding ring 33 disposed at abutment housing 16. Ring 33 forces abutment housing 16 into abutment with a step 34 in the interior of piston 22. As soon as the pitch of disc spring 17 is surpassed expanding ring 33 will yield upon overcoming of a certain resistance and will permit abutment housing 16 to separate from piston 22 without involving the danger of a destruction of the adjusting device. According to the invention expanding ring 33 is used which in the direction of the destruction generates about the five-fold resistance strength in comparison to the opposite direction. Thereby a considerable facilitation in respect of the assembly is achieved in combination with a protection against damages during assembly.

A further essential feature of the embodiment of FIG. 6 consists in that helical torsion spring 25 is disposed in front of abutment housing 16. In order to provide the additional structural space required to this end groove 28 at the piston bottom or disc end of the piston bore is somewhat deeper than in the embodiment of FIG. 1 and will receive a spacer sleeve 35 apart from flange 12a, said spacer sleeve 35 extending around spring 25 and being long enough so it will project into the expansion of space 36 provided for the reception of the disc spring 17 with disc spring 17 abutting sleeve 35. On the other hand, disc spring 17 will abut the abutment housing 16 so that it also may exert a return torque on piston 22 and represent a safety against twisting of adjusting nut 12.

While we have described above the principles of our invention in connection with specific apparatus it is to be cleary understood that this description is made only by way of example and not as a limitation to the scope of our invention as set forth in the objects thereof and in the accompanying claims.

We claim:

1. A self-adjusting device for a disc brake comprising:
   an actuating piston having a longitudinal axis and bore coaxial of said axis, said bore being closed at one end of said piston;
   an adjusting spindle in a fixed position coaxial of said axis having threads on the outer surface thereof and extending out of the other end of said piston;
   an adjusting nut having threads for threading onto said spindle;
   an arrangement associated with said nut to rotate said nut on said spindle to permit the desired self-adjustment;
   an abutment secured to said nut adjacent said one end of said piston;
   an abutment element coaxial of said axis and said nut fixed to the inner surface of said bore to prevent axial motion thereof; and
   a return spring disposed between said abutment and said abutment element;
   said abutment including
   a disc disposed in a transverse relation to said bore, said disc having teeth disposed at given intervals on the periphery of said disc, said teeth being in contact with said inner surface of said bore.

2. A device according to claim 1, wherein brake clearance is defined by a predetermined play between said threads of said spindle and said nut.

3. A self-adjusting device for a disc brake comprising:
   an actuating piston having a longitudinal axis and bore coaxial of said axis, said bore being closed at one end of said piston;
   an adjusting spindle in a fixed position coaxial of said axis having threads on the outer surface thereof and extending out of the other end of said piston;
   an adjusting nut having threads for threading onto said spindle;
   an arrangement associated with said nut to rotate said nut on said spindle to permit the desired self-adjustment;
   an abutment secured to said nut adjacent said one end of said piston;

an abutment element coaxial of said axis and said nut fixed to the inner surface of said bore to prevent axial motion thereof; and a return spring disposed between said abutment and said abutment element;

said abutment element including an abutment housing disposed coaxially of said nut, said abutment housing having a portion thereof extending radially for contact with the inner surface of said bore; and further including a first annular groove in said portion, a second annular groove in the inner surface of said bore in a cooperating relationship with said first groove, and a spring ring disposed in both said first and second grooves to prevent axial motion of said abutment housing.

4. A device according to claim 3, wherein said abutment element includes a transverse surface of said abutment housing spaced a small distance from said abutment, and said return spring includes a disc spring encircling said nut and disposed between said transverse surface and said abutment.

5. A device according to claim 4, wherein said disc spring includes two disc springs disposed one on top of the other.

6. A device according to claim 3, wherein said arrangement includes an engaging sleeve disposed coaxially of said nut and between said nut and said abutment housing in a freely rotatable relationship therewith.

7. A device according to claim 6, wherein said abutment housing includes an annular bearing surface adjacent said one end of said piston; and said engaging sleeve includes a cone secured thereto, the base of said cone being disposed adjacent said one end of said piston, said cone cooperating with said bearing surface during said adjustment operation to provide a strong frictional connection between said cone and said abutment housing.

8. A device according to claim 7, wherein said arrangement further includes a helical torsion spring disposed coaxial of said nut adjacent said other end of said piston and interconnecting said engaging sleeve and said nut.

9. A device according to claim 8, wherein said helical torsion spring twists said engaging sleeve in the direction to cause said cone to move toward said bearing surface.

10. A device according to claim 9, wherein said helical torsion spring further exerts an axial force on said engaging sleeve to bring said cone into slight contact with said bearing surface, said contact not disturbing the rotation of said engaging sleeve.

11. A device according to claim 8, wherein said helical torsion spring exerts an axial force on said engaging sleeve to bring said cone into slight contact with said bearing surface, said contact not disturbing the rotation of said engaging sleeve.

12. A self-adjusting device for a disc brake comprising:

an actuating piston having a longitudinal axis and bore coaxial of said axis, said bore being closed at one end of said piston;

an adjusting spindle in a fixed position coaxial of said axis having threads on the outer surface thereof and extending out of the other end of said piston;

an adjusting nut having threads for threading onto said spindle;

an arrangement associated with said nut to rotate said nut on said spindle to permit the desired self-adjustment;

an abutment secured to said nut adjacent said one end of said piston;

an abutment element coaxial of said axis and said nut fixed to the inner surface of said bore to prevent axial motion thereof; and a return spring disposed between said abutment and said abutment element;

said abutment element including an abutment housing disposed coaxially of and encircling said nut, said abutment housing including an internal cylindrical wall having an outwardly directed step adjacent said one end of said piston, the end of said cylindrical wall at said step providing an annular bearing surface and the end of said cylinder wall after said step providing a transverse surface;

said arrangement including an engaging sleeve disposed coaxially of said nut and between said nut and said abutment housing in a freely rotatable relationship therewith, said engaging sleeve including a cone secured thereto, the base of said cone being disposed adjacent said one end of said piston, said cone cooperating with said bearing surface during said adjusting operation to provide a strong frictional connection between said cone and said abutment housing; and said return spring including a disc spring encircling said nut and disposed between said transverse surface and said abutment.

13. A device according to claim 12, further including a retaining ring secured to the outer surface of said nut between said other end of said piston and said abutment housing and said engaging sleeve.

14. A self-adjusting device for a disc brake comprising:

an actuating piston having a longitudinal axis and bore coaxial of said axis, said bore being closed at one end of said piston;

an adjusting spindle in a fixed position coaxial of said axis having threads on the outer surface thereof and extending out of the other end of said piston;

an adjusting nut having threads for threading onto said spindle;

an arrangement associated with said nut to rotate said nut on said spindle to permit the desired self-adjustment;

an abutment secured to said nut adjacent said one end of said piston;

an abutment element coaxial of said axis and said nut fixed to the inner surface of said bore to prevent axial motion thereof;

a return spring disposed between said abutment and said abutment element; and a retaining ring secured to the outer surface of said nut between said other end of said piston and said abutment element.

15. A self-adjusting device for a disc brake comprising:
an actuating piston having a longitudinal axis and bore coaxial of said axis, said bore being closed at one end of said piston;
an adjusting spindle in a fixed position coaxial of said axis having threads on the outer surface thereof and extending out of the other end of said piston;
an adjusting nut having threads for threading onto said spindle;
an arrangement associated with said nut to rotate said nut on said spindle to permit the desired self-adjustment;
an abutment secured to said nut adjacent said one end of said piston;
an abutment element coaxial of said axis and said nut fixed to the inner surface of said bore to prevent axial motion thereof;
a return spring disposed between said abutment and said abutment element;
a groove disposed in said piston adjacent said one end of said piston and coaxial of said axis; and
said abutment is guided in said groove.

16. A device according to claim 15, wherein
the length of said groove equals the thickness of said abutment.

17. A device according to claim 15, wherein
said return spring is prestressed.

18. A self-adjusting device for a disc brake comprising:
an actuating piston having a longitudinal axis and bore coaxial of said axis, said bore being closed at one end of said piston;
an adjusting spindle in a fixed position coaxial of said axis having threads on the outer surface thereof and extending out of the other end of said piston;
an adjusting nut having threads for threading onto said spindle;
an arrangement associated with said nut to rotate said nut on said spindle to permit the desired self-adjustment;
an abutment secured to said nut adjacent said one end of said piston;
an abutment element coaxial of said axis and said nut fixed to the inner surface of said bore to prevent axial motion thereof; and
a return spring disposed between said abutment and said abutment element;
said arrangement including
an engaging sleeve disposed coaxially of said axis encircling said nut in a freely rotatable relationship therewith,
said engaging sleeve having a cone secured thereto adjacent said other end of said piston, said cone tapering towards said other end of said piston; and
said abutment element including
an abutment ring fixed to the inner wall of said bore adjacent said other end of said piston, the inner diameter of said abutment ring cooperates with said cone to provide a strong frictional connection between said cone and said abutment ring during said adjustment operation.

19. A device according to claim 18, wherein
said return spring includes
a helical pressure spring disposed coaxial of said axis and encircling said engaging sleeve and also disposed between said abutment and said abutment ring.

20. A device according to claim 19, further including
an anti-twisting ring connected between said abutment and said helical pressure spring.

21. A device according to claim 20, further including
longitudinal slots disposed in the inner surface of said bore, and
said anti-twisting ring is supported in said slots so as to be torsionally strong yet axially displaceable.

22. A device according to claim 20, wherein
the inner wall of said bore adjacent said one end of said piston is shaped to conform to the shape of said anti-twisting ring.

23. A device according to claim 18, wherein
said arrangement further includes
a helical torsion spring disposed coaxially of said axis and encircling said nut and disposed between said abutment and said engaging sleeve to exert a torque on said engaging sleeve for movement of said cone towards said abutment ring.

24. A device according to claim 18, wherein
the inside and outside periphery of said abutment ring include vent slots.

25. A self-adjusting device for a disc brake comprising:
an actuating piston having a longitudinal axis and bore coaxial of said axis, said bore being closed at one end of said piston;
an adjusting spindle in a fixed position coaxial of said axis having threads on the outer surface thereof and extending out of the other end of said piston;
an adjusting nut having threads for threading onto said spindle;
an arrangement associated with said nut to rotate said nut on said spindle to permit the desired self-adjustment;
an abutment secured to said nut adjacent said one end of said piston;
an abutment element coaxial of said axis and said nut fixed to the inner surface of said bore to prevent axial motion thereof; and
a return spring disposed between said abutment and said abutment element;
said arrangement including
a catch element secured to the outer surface of said nut; and
said abutment element including
a sheet metal housing disposed coaxial of said axis and encircling said nut, said sheet metal housing having cone elements secured to the end of said sheet metal housing adjacent said other end of said housing, said cone elements being tapered toward said other end of said housing and in a cooperative relationship with said catch element to provide a strong frictional connection between said cone elements and said catch element during said adjustment operation.

26. A device according to claim 25, wherein
said nut includes on the outer surface thereof a steep thread; and
said catch element includes on the inner periphery thereof teeth to cooperate with said steep thread.

27. A self-adjusting device for a disc brake comprising:
- an actuating piston having a longitudinal axis and bore coaxial of said axis, said bore being closed at one end of said piston;
- an adjusting spindle in a fixed position coaxial of said axis having threads on the outer surface thereof and extending out of the other end of said piston;
- an adjusting nut having threads for threading onto said spindle;
- an arrangement associated with said nut to rotate said nut on said spindle to permit the desired self-adjustment;
- an abutment secured to said nut adjacent said one end of said piston;
- an abutment element coaxial of said axis and said nut fixed to the inner surface of said bore to prevent axial motion thereof; and
- a return spring disposed between said abutment and said abutment element;
- said bore including
  - a first step on the inner surface thereof spaced from said one end of said piston to reduce the diameter of said bore by a first given amount, and
  - a second step on the inner surface thereof between said first step and said one end of said piston to reduce the diameter of said bore by a second given amount greater than said first given amount; and further including
- an expanding ring disposed in cooperative relationship with said abutment element to cause said abutment element to be retained in place against said first step.

28. A device according to claim 27, wherein
said abutment is disposed at the closed end of said bore; further including
a spacer sleeve disposed coaxial of said axis, and encircling said nut and disposed in contact with said abutment and extending towards said other end of said piston beyond said second step; and wherein
said return spring includes
a disc spring disposed in transverse relation to said bore and encircling said nut, said disc spring being disposed between said first and second step in contact with said spacer sleeve and said abutment element.

29. A device according to claim 28, wherein
said arrangement includes
a helical torsion spring disposed to encircle said nut and to be between said nut and said spacer sleeve and said disc spring.

* * * * *